E. F. KELLEY.
METHOD OF MAKING CONE CLUTCH FACINGS.
APPLICATION FILED FEB. 3, 1915.

1,180,503.

Patented Apr. 25, 1916.

WITNESSES:
H. W. Meade
E. M. Culver

INVENTOR
Edward F. Kelley
BY
A. M. Wooster
ATTORNEY

UNITED STATES PATENT OFFICE.

EDWARD F. KELLEY, OF BRIDGEPORT, CONNECTICUT, ASSIGNOR TO THE ROYAL EQUIPMENT COMPANY, OF BRIDGEPORT, CONNECTICUT, A CORPORATION OF CONNECTICUT.

METHOD OF MAKING CONE-CLUTCH FACINGS.

1,180,503.  Specification of Letters Patent.  Patented Apr. 25, 1916.

Application filed February 3, 1915. Serial No. 5,951.

*To all whom it may concern:*

Be it known that I, EDWARD F. KELLEY, a citizen of the United States, residing at Bridgeport, county of Fairfield, State of Connecticut, have invented an Improvement in Methods of Making Cone-Clutch Facings, of which the following is a specification.

This invention consists of a novel method of making tapering asbestos cone-clutch facings which shall be of uniform size, of uniform taper, and of uniform thickness so that every facing shall have the exact taper of the corresponding clutch members, every portion of the inner side of the facing engaging the male clutch member and every portion of the outer side of the facing engaging the female clutch member, without machining or any additional operations, every facing being ready for use when it leaves the dies.

It has heretofore been practically impossible, so far as I am aware, to produce, without machining, asbestos club facing, that were not rough and irregular, and of uneven thickness and therefore unable to grip all portions of the face of either clutch member. These objections I wholly overcome and am enabled by my novel method to produce asbestos clutch facings smooth and even on both faces, of uniform thickness in all portions and having the exact taper of the clutch members with which they are to be used.

Figure 1:
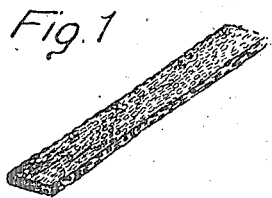
Figure 2:
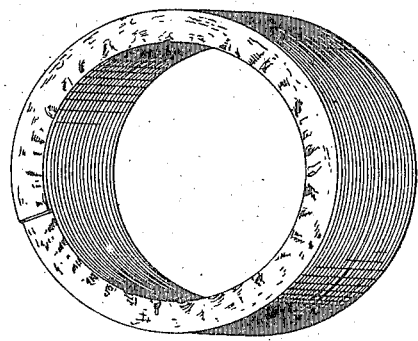
Figure 3:
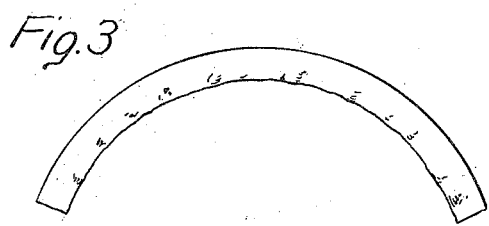
Figure 5:
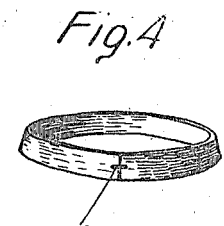
Figure 4:
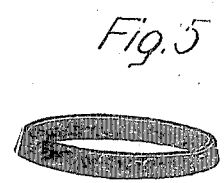
Figure 6:
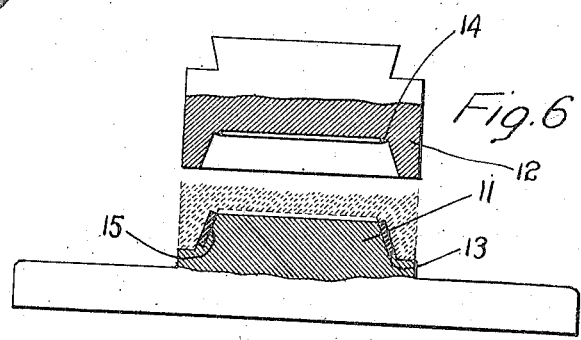

In the accompanying drawing forming a part of this specification, Figure 1 is a perspective view of a piece of woven asbestos tape; Fig. 2 a perspective view of a roll of asbestos tape coiled edgewise; Fig. 3 an elevation of a sector-shaped blank of the material; Fig. 4 a perspective view showing the ends of the blank brought together and secured, as by a staple; Fig. 5 a similar view showing the facing after hardening, and Fig. 6 is a sectional view illustrating the final operation of shaping, condensing and smoothing the hardened facing by dies under pressure.

In carrying out my invention I use ordinary woven asbestos tape, either with or without longitudinal wire strands. This asbestos tape is immersed in a suitable hardening compound which is adapted to give to the facings the necessary tensile strength and wear resisting, heat proof and waterproof qualities. The invention is not limited to any specific hardening compound, for the reason that various compositions may be employed for this purpose. For instance, such a hardening compound may be formed of linseed oil and silicate of soda combined. The saturated asbestos tape, while soft, is then coiled edgewise on a mandrel and dried thereon. Heat may or may not be applied, as preferred, in the operation of drying. After the edge coil of asbestos tape has been dried, it is removed from the mandrel and sector-shaped blanks (see Fig. 3) are cut therefrom. The ends of these blanks are then brought together and fastened in any suitable manner, as by staples 10 (see Fig. 4) one or more staples being used, depending of course upon the width of the facings. The last step in the method is the subjecting of the hardened facings to great pressure in dies by which they are accurately shaped, condensed and smoothed. It will of course be understood that in coiling the saturated tape edgewise upon a mandrel, the inner edge of the coiled tape is necessarily puckered more or less, as indicated in Figs. 2 and 3. As the facings are tapering, there is necessarily an extra amount of material unevenly disposed, at the small end of the facing. In the drying operation moreover, the facings tend to warp more or less, and they come out of that operation very hard, of uneven thickness and of irregular shape.

11 denotes the male die and 12 the female die. The male die is provided with a circular shoulder 13 and the female die with a circular shoulder 14. Between these shoulders and between the respective faces of the male and female dies, is a space 15 which is the exact size as regards width, thickness and taper, that is required of the finished facing to give it perfect contact with the faces of the two clutch members with which it is to be used.

It is immaterial so far as the present invention is concerned whether or not the dies are heated. I preferably however use cold dies and effect the shaping, condensing, and smoothing of the hardened facings by the application of great pressure.

Having thus described my invention I claim:—

1. The method of making cone-clutch facings which consists in saturating asbestos tape with a hardening solution, coiling the saturated tape edgewise, cutting the coiled tape into sector-shaped blanks, joining the ends of each of said sector-shaped blanks, and finally shaping, condensing and smoothing the blank by pressure.

2. The method of making cone-clutch facings which consists in coiling saturated asbestos tape edgewise, cutting the coiled tape into sector-shaped blanks, joining the ends of each of said sector-shaped blanks, and then shaping, condensing and smoothing the facings by pressure.

3. The method of making cone-clutch facings which consists in saturating asbestos tape with a hardening solution, coiling the saturated tape edgewise, cutting the coiled tape into sector-shaped blanks, drying, joining the ends of each of said sector-shaped blanks, and then subjecting to pressure to give to the finished facings uniform thickness, taper and width.

4. The method of making cone-clutch facings which consists in coiling saturated asbestos tape edgewise, cutting sector-shaped blanks from the coil, joining the ends of each of the blanks, and then finishing by pressure.

5. The method of making clutch facings which consists in coiling saturated asbestos tape edgewise, cutting the coiled tape into sector-shaped blanks, joining the ends of each of said sector-shaped blanks and then finishing by pressure.

In testimony whereof I affix my signature in presence of two witnesses.

EDWARD F. KELLEY.

Witnesses:
S. SIMPSON,
ARTHUR C. MACY.